United States Patent
Maeda

(10) Patent No.: US 6,317,563 B1
(45) Date of Patent: *Nov. 13, 2001

(54) FOCUSING DEVICE

(75) Inventor: Kazuyuki Maeda, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/862,352

(22) Filed: May 23, 1997

Related U.S. Application Data

(63) Continuation of application No. 08/443,425, filed on May 18, 1995, now abandoned.

(30) Foreign Application Priority Data

May 26, 1994 (JP) .................................................. 6-134901

(51) Int. Cl.$^7$ ............................ G03B 17/00; G03B 13/00; G03B 3/00
(52) U.S. Cl. ................................................. 396/80; 396/102
(58) Field of Search ................................ 396/79–80, 104, 396/121, 102; 250/201.6, 201.4; 356/1, 4, 4.01

(56) References Cited

U.S. PATENT DOCUMENTS

| | | | | |
|---|---|---|---|---|
| 4,693,581 | * | 9/1987 | Yamaki et al. | 396/102 |
| 4,908,646 | * | 3/1990 | Sato et al. | 354/403 |
| 4,947,202 | * | 8/1990 | Kitajima et al. | 354/403 |
| 4,954,861 | * | 9/1990 | Nagaoka et al. | 354/403 |
| 5,001,508 | * | 3/1991 | Ogawa | 354/403 |
| 5,040,015 | * | 8/1991 | Hamada et al. | 396/102 |
| 5,082,363 | * | 1/1992 | Nakanishi et al. | 356/1 |
| 5,087,119 | * | 2/1992 | Kaneko et al. | 356/1 |
| 5,107,449 | | 4/1992 | Ikuta | 364/561 |
| 5,130,735 | * | 7/1992 | Kusaka et al. | 396/102 |
| 5,204,714 | * | 4/1993 | Nonaka et al. | 354/403 |
| 5,223,885 | * | 6/1993 | Nakajima | 354/403 |
| 5,361,118 | | 11/1994 | Taka et al. | 354/403 |
| 5,400,111 | | 3/1995 | Taka et al. | 354/403 |

FOREIGN PATENT DOCUMENTS 60-59313   4/1985  (JP) .
1123109    5/1989  (JP) .

* cited by examiner

Primary Examiner—Russell Adams
Assistant Examiner—Christopher E. Mahoney
(74) Attorney, Agent, or Firm—Fitzpatrick, Cella, Harper & Scinto

(57) ABSTRACT

A focusing device has a first unit for producing information for focusing an optical unit and a second unit for forming, based on a predetermined number of pieces of the information derived from the first unit, an operation instruction signal for operating the optical unit. The second unit, when an actuating signal is input while a number of pieces of information from the first unit is still smaller than the predetermined number, forms the operation instruction signal based on a smaller number of pieces of information than the predetermined number.

24 Claims, 3 Drawing Sheets

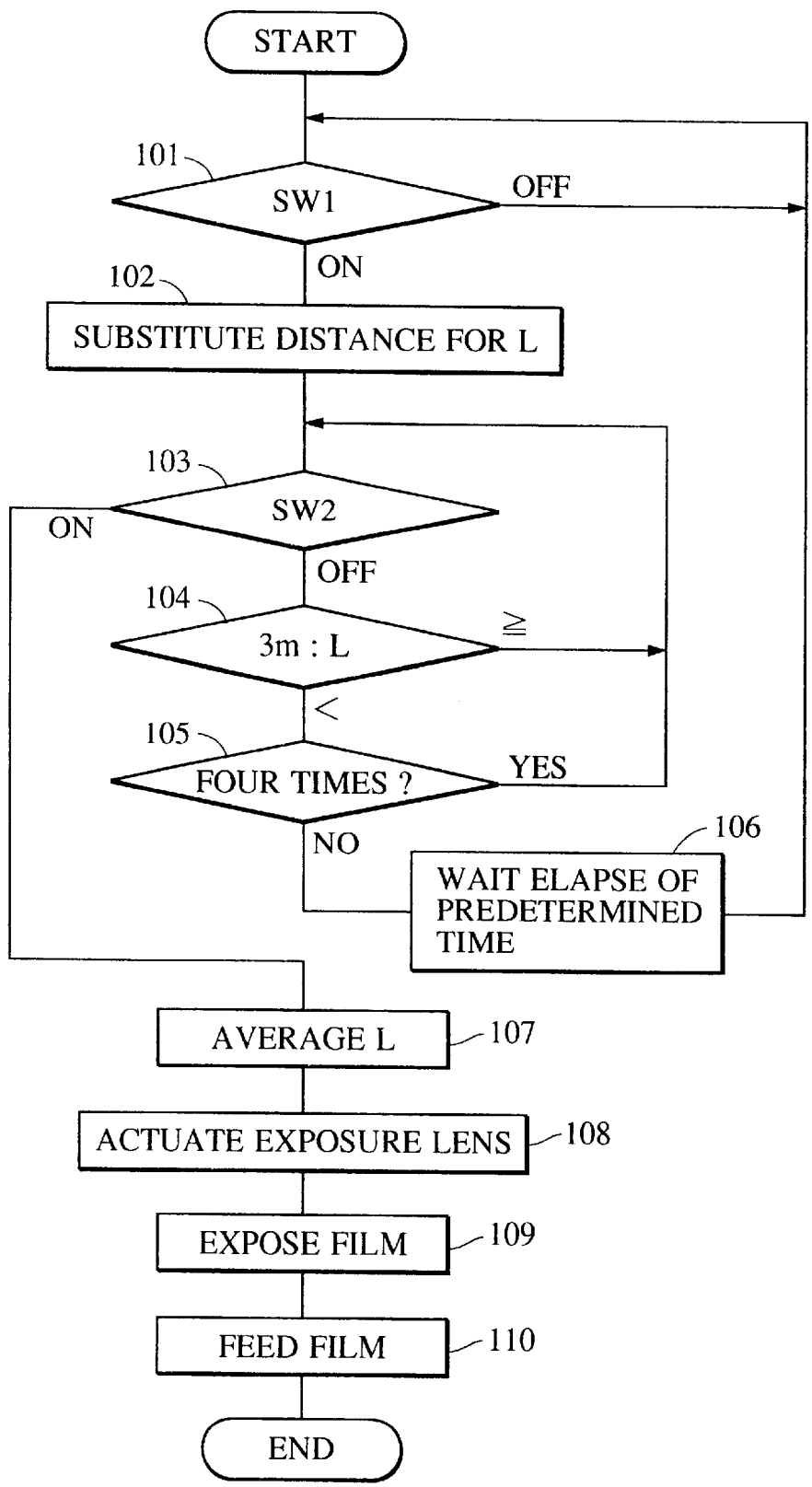

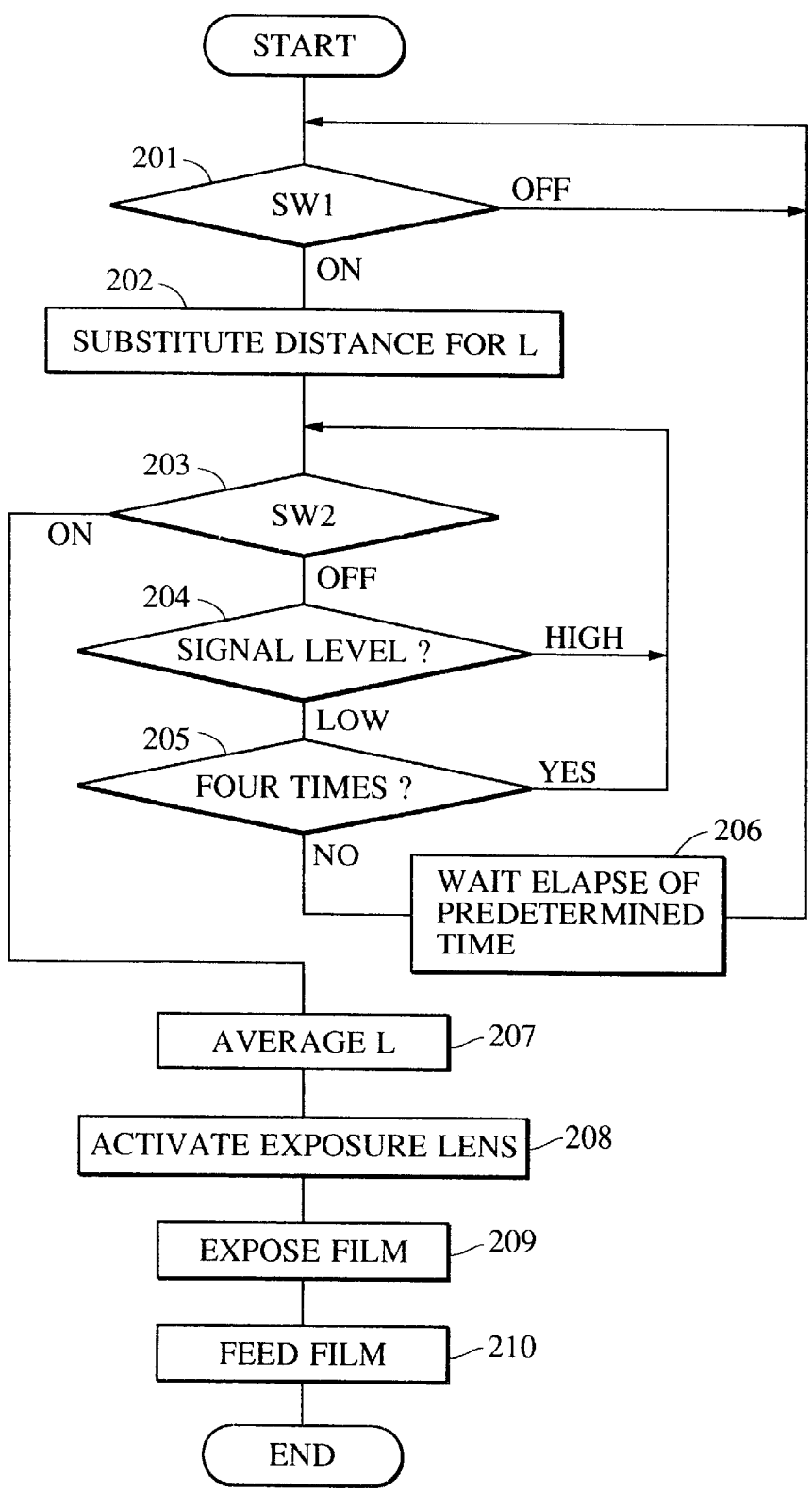

FOCUSING DEVICE

This application is a continuation of Application No. Ser. 08/443,425 filed May 18, 1995 now abandoned.

BACKGROUND OF THE INVENTION

1. Field of the Invention

The present invention relates to an improvement in a focusing device suitable for use in, for example, a camera.

2. Description of the related Art

Hitherto, an active range finding system has been known in which, as disclosed in Japanese Patent Laid-Open No. 60-59313, the quantity of light projected is determined based on the data obtained in previous range finding data such that the quantity of projected light is reduced when the previously obtained range finding data indicates that the distance to a subject is short, whereas, when the previously obtained range finding data indicates that the subject is at a long distance, the quantity of the projected light is increased. This arrangement is effective in preventing saturation of a signal processing circuit which otherwise may occur when the distance to the subject is small.

Meanwhile, Japanese Patent Laid-Open No. 1-123109 discloses an active type range finding system which calculates distance data through a double integration. In this device, the integration time is varied depending on the magnitude of the received light signal. More specifically, when the magnitude of the received light signal is small as in the case where the distance to a subject is large or in the case where the reflectivity of the subject is small, the integration time is set to a longer value, whereas, when the magnitude of the received light signal is large, the integration time is set to a shorter value. According to this arrangement, the S/N ratio is improved particularly when the distance to the subject is large and when the reflectivity of the subject is small, thus offering higher precision of the range finding operation.

These known range finding systems, however, have suffered from the following problems.

In the first-mentioned range finding system proposed in Japanese Patent Laid-Open No. 60-59313, the quantity of the light projected is reduced when the distance to the subject is small, and the range finding information is calculated only through a single range finding action with such a reduced quantity of projected light. Consequently, the output signal of the range finding system tends to be degraded by noise component, i.e., the S/N ratio tends to be lowered, resulting in an inferior range finding precision.

In the second-mentioned range finding system disclosed in Japanese Patent Laid-Open No. 1-123109, the integration time is set to a large value for a subject which is at a long distance or which has a small reflectivity, in order to improve the S/N ratio. The prolonged integration time tends to increase probability of erroneous measurement due to, for example, inclusion of a luminescent noise such as that produced by an electronic flash during the integrating operation. In addition, the projection efficiency (illuminance efficiency) of the light projection element tends to be reduced due to a long time of energization, with the result that the output of the light projection element is changed in relation to time. This appears as a difference in the light projection output between the period of ascending integration and the period of descending integration, thus impairing precision of the range finding operation.

In order to obviate these problems, the present applicant has proposed, in U.S. Pat. No. 5,107,449, a range finding system in which a plurality of cycles of range finding operation, each cycle being of a short time, are performed repeatedly, and range finding information is finally obtained by synthesizing the results of such a plurality of cycles of operation, thus achieving higher precision of range finding operation.

A problem encountered by this range finding system is that a considerable time is required until the final range finding information is obtained, due to repetition of many range finding cycles, so that the photographer may lose a photagraphic opportunity or mistime a shot.

SUMMARY OF THE INVENTION

Accordingly, an object of the present invention is to provide a focusing device having both a high degree of accuracy and a high speed of operation.

To this end, according to one aspect of the present invention, there is provided a focusing device including first means for producing information for focusing an optical unit; and second means for forming, based on a predetermined number of pieces of the information derived from the first means, an operation instruction signal for operating the optical unit, the second means, when an actuating signal is input while a number of pieces of information from the first means is still smaller than the predetermined number, forming the operation instruction signal based on a smaller number of pieces of information than the predetermined number.

The above and other objects, features and advantages of the present invention will become clear from the following description of the preferred embodiments.

BRIEF DESCRIPTION OF THE DRAWINGS

FIG. 2 is a flow chart illustrative of operation of the first embodiment; and

FIG. 3 is a flow chart illustrative of a second embodiment of the present invention.

DESCRIPTION OF THE PREFERRED EMBODIMENTS

Figure 1:
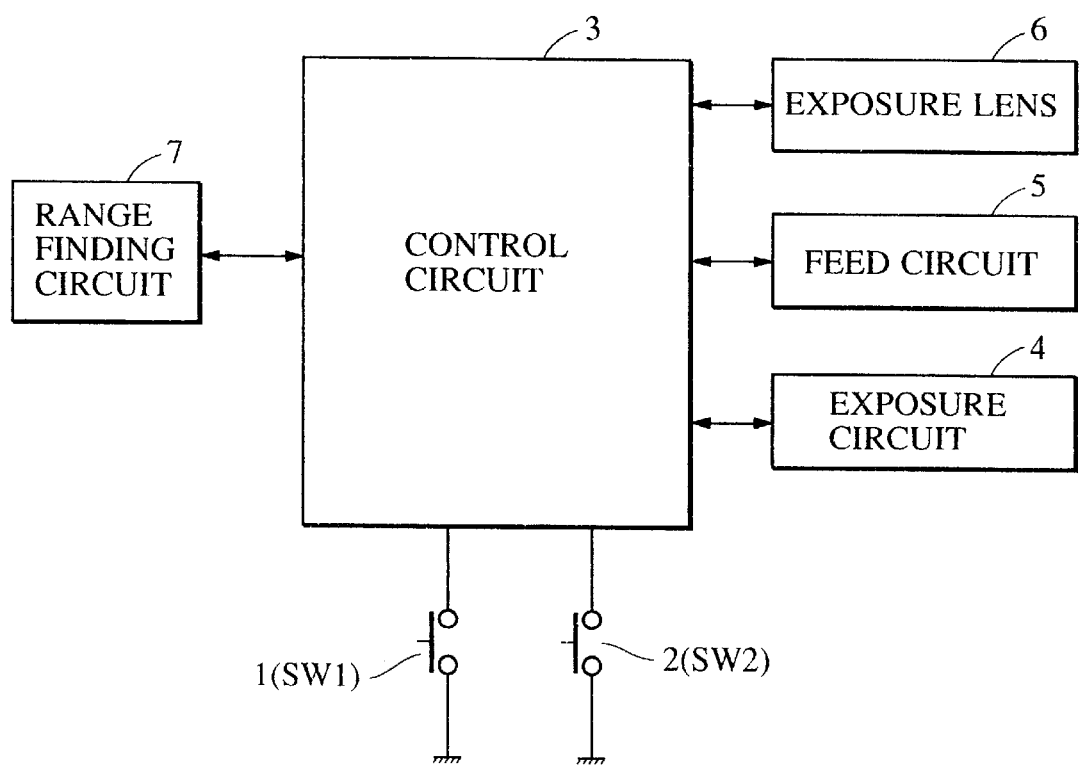
FIG. 1 is a block diagram schematically showing the construction of a camera incorporating a range finding focusing device in accordance with a first embodiment of the present invention.

Preferred embodiments of the present invention will be described with reference to the drawings.

FIG. 1 is a block diagram illustrating a first embodiment of the range finding focusing device of the present invention applied to a camera.

The camera has a switch 1(SW1) which is adapted to be turned on in response a to first stroking of a release button (not shown), and a switch 2(SW2) which is turned on in response a to second stroking of the release button. The camera also has a control circuit 3 which controls various operations performed in the camera and which may be constituted by a microcomputer or the like. The camera further has various circuits including an exposure circuit 4 for actuating a shutter, a feed circuit 5 for winding and rewinding a film, and an exposure lens driving circuit 6 for driving an exposure lens which also is denoted by 6. The camera also includes an active range finding circuit 7 for producing range-finding information, by means of a circuit such as a double integration circuit based on a received light signal derived from a light-receiving element which receives light projected by a light projecting element (not shown) to a photographic subject and reflected therefrom. This active range finding circuit is known and, therefore, is not described in more detail.

The operation of the control circuit 3 will be described with specific reference to FIG. 2 which is a flow chart illustrative of the operation.

In Step 101, the state of the switch SW1 is examined to determine whether the first stroking of the release button (not shown) has been performed. If the switch SW1 has not been turned on, i.e., if it is still off, the process does not proceed from this Step. However, if the switch SW1 has been turned on, the process proceeds to Step 102 in which the range finding circuit 7 is activated to compute range finding information, and the resultant range finding information is substituted for a variable L by the microcomputer of the control circuit In Step 103, the state of the switch SW2 is examined for the purpose of determination as to whether the second stroking of the release button has been performed. If the switch SW2 is off, the process proceeds to Step 104 which determines whether or not the distance indicated by the range finding information is not less than a predetermined distance which is, in this embodiment, 3 meters. If the distance is shorter than the predetermined distance, the range finding device of this embodiment, which is of active type and which is composed of a range finding circuit 7 and a control circuit 3, can operate with such a large value of S/N ratio that ensures high accuracy of range finding even with a single cycle of range finding operation. In this case, therefore, the process returns without delay to Step 103 which determines the state of the switch SW2.

Conversely, when the distance indicated by the above-mentioned range-finding information obtained in Step 102 is greater than the above-mentioned predetermined distance, it is decided that the S/N ratio of the output from the range finding circuit is insufficient so that a plurality of cycles, four cycles in this embodiment, will be needed, and the process proceeds to Step 105 for repetition of the range finding cycle. Thus, Step 105 determines whether or not four cycles the range finding operation have been finished. Obviously, the answer is "NO" at the beginning, so that the process advances to Step 106 and, after elapse of a predetermined time, e.g., 10 msec, the process returns to Step 101. This operation is continued as long as the switch SW1 is on while the switch SW2 is off. When completion of four cycles of range finding operation is confirmed in Step 105, the process returns from Step 105 to Step 103 to wait for turning on of the switch SW2.

The above-mentioned predetermined time set in Step 106 is intended to prevent reduction in the light projection efficiency which otherwise may be caused due to heating of the light projection element when the range finding operation is continued without suspension.

Then, the second stroking of the release button (not shown) is performed to turn the switch SW2 on, and the process proceeds from Step 103 to Step 107 in which final range finding information is determined. More specifically, this occurs when the distance to the subject has been determined to be greater than the predetermined distance, and four pieces of range finding information have been obtained through four cycles of range finding operation. In Step 107, therefore, the final range finding information is determined as an average of these four pieces of information. Obviously, the S/N ratio of the range finding circuit output is worsened when the distance to the subject is large, so that different distance values are obtained in different cycles of the range finding operation. The difference between the greatest value of the distance and the smallest value of the distance determined through the four cycles of range finding operation will be referred to as "maximum credible error". If the focusing operation relies upon the result of only one cycle of range finding operation, there is a risk that a defocus of the optical system occurs by an amount which may be as large as the "maximum credible error". This risk, however, can be diminished by averaging the results of the four cycles of range finding operation so as to decrease the amount of the maximum credible error, thereby seemingly improving the S/N ratio and, accordingly, improving the accuracy of the range finding information.

Then, in Step 108, the exposure lens 6 is actuated by a focusing actuator motor (not shown) in accordance with the range finding information obtained in Step 107, thereby to achieve an in-focus state of the optical system. Then, the process advances to Step 109 so as to drive the shutter through the operation of the exposure circuit 4, thereby exposing the film. Subsequently, the feed circuit 5 is activated to effect winding of the film by an amount corresponding to one frame, in step 110 so as to bring the next frame to the exposure position.

The flow chart in FIG. 2 applies to a camera of release preferential type in which priority is given to a shutter release instruction. Thus, when the distance to the subject is greater than the predetermined distance, the exposure is executed whenever the switch SW2 is turned on by full stroking of the release button, even when the number of cycles of range finding operation performed is still less than 4.

FIG. 3 is a flow chart illustrative of the operation of a camera incorporating a range finding device of a second embodiment of the present invention. The hardware or the circuitry of this embodiment is basically the same as that shown in FIG. 1 so that description is omitted as to the structural features of the second embodiment. The second embodiment is different from the first embodiment in the nature of Step 204 of the process.

Assuming that a subject of an ordinary infrared reflectivity of 16 to 90 % is located at a distance of, for example, 2 meters which is smaller than the predetermined distance (3 meters in this case), a sufficiently high S/N ratio can be obtained so that the range finding focusing operation can be performed without a problem. However, the signal level may be too low to provide a satisfactorily high S/N ratio, when the subject has an extraordinarily low infrared reflectivity, e.g., 4% or so, as is the case of black hair, or when the spot of the projected light does not correctly impinge upon the subject. Thus, the first embodiment as described involves a risk that the accuracy of range finding focusing operation may be impaired even when the subject is within a predetermined range.

In order to obviate this problem, in the second embodiment of the present invention, the number of cycles of the range finding operation to be performed is varied in accordance with the level of the signal indicative of the quantity of light reflected by and received from the subject. More specifically, when the signal level is higher than a predetermined level, it is decided that a single cycle of range finding operation suffices, so that the process proceeds to Step 203 to wait for turning on of the switch SW2, whereas, when the signal level is equal to or lower than the predetermined level, the process proceeds to Step 205 for performing four cycles of range finding operation as in the case of the first embodiment. It is therefore possible to eliminate the above-described problem encountered by the first embodiment.

Determination as to whether the signal level is higher than the predetermined level or not may be conducted by means of a comparator (not shown) which compares the level of the received light signal with the predetermined value or, when a double integrating circuit or the like is used, the integrated value is digitized by an A/D converter (not shown) and compared with a digital value.

Steps 206 through 210 are performed in a manner substantially the same as that of steps 106 through 110, as shown in FIG. 2.

Any type of range finding device can be used in the focusing device of the present invention. For instance, the focusing device of the invention may be designed to operate based on defocus information rather than distance information. The focusing device of the invention also may be constructed in the form of a so-called multi-point range finding system which performs focusing operation based on distance information or defocus information on a plurality of points in the field. In such a case, the arrangement may be such that, when a releasing operation, i.e., full stroking of the release button, is executed in the course of the range finding operation before the distance information or defocus information is obtained on all of a plurality of points, the range finding operation is ceased and the focusing control of the exposure lens is conducted based on the distance or defocus information which has been acquired before the releasing operation, thus giving preference to the releasing operation.

Furthermore, while the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

At the same time, the individual components shown in schematic or block form in the drawings are all well known in the camera arts and their specific construction and operation are not critical to the operation or best mode for carrying out the invention.

It is also to be understood that the described embodiments or technical features thereof may be combined in various forms and such combinations also fall within the scope of the present invention.

The invention may be carried out in various forms. For instance, the claimed structure or the described embodiment may wholly or partly be constructed as a unit or may be combined with another device, or even may constitute a part of a single system.

It is also to be appreciated that the focusing device in accordance with the present invention can be applied to various types of cameras such as a single lens reflex camera, a lens shutter camera, a video camera and so forth, as well as to other types of optical instruments other than cameras and also to different kinds of apparatuses. The invention also can be applied to a device which is to be used as a component of such a camera, optical instrument or apparatus, and also to an element of such a component.

What is claimed is:

1. A focusing apparatus comprising:
   (A) a detection device which produces, in successive time periods, a plurality of pieces of information for focusing an optical unit; and
   (B) a signal forming circuit which determines the average of a predetermined number of said pieces of information and which, based upon said average, forms an operation instruction signal for focusing said optical unit,
   said signal forming circuit being responsive to the actuation of an operation member for starting photography while the number of pieces of information from said detection device is still smaller than the predetermined number, to determine a different average which is the average of the smaller number of pieces of information, to form the operation instruction signal for focusing said optical unit.

2. A focusing apparatus according to claim 1, wherein said detection circuit includes a unit which produces range finding information.

3. A focusing apparatus according to claim 1, wherein said optical unit includes a photographic lens.

4. A focusing apparatus according to claim 1, wherein said signal forming circuit includes means for forming the operation instruction based on information obtained through averaging a plurality of pieces of information from said detection circuit.

5. A focusing apparatus according to claim 1, wherein the operation member for starting photography includes a shutter release member.

6. A focusing apparatus according to claim 1, wherein said signal forming circuit includes means for changing the predetermined number in accordance with a distance indicated by the information from said detection circuit.

7. A focusing apparatus according to claim 1, wherein said detection circuit includes a unit which produces the information through a double integration.

8. A focusing apparatus according to claim 1, wherein said signal forming circuit includes means for causing said detection circuit to repeat an operation the predetermined number of times so as to enable said detection circuit to produce the predetermined number of pieces of information.

9. A focusing apparatus according to claim 8, wherein said signal forming circuit includes means for setting a predetermined suspension period between successive operations of said detection circuit.

10. A focusing apparatus according to claim 1, wherein said signal forming circuit includes means for changing the predetermined number in accordance with a level of light received by said detection circuit so as to produce the information.

11. A focusing apparatus according to claim 1, wherein said signal forming circuit includes a unit which actuates said optical unit in accordance with the operation instruction.

12. An optical apparatus comprising:
   (A) a detection device which produces, in successive time periods, a plurality of pieces of information for focusing an optical unit; and
   (B) a signal forming circuit which determines the average of a predetermined number of said pieces of information, and which, based on said average, forms an operating instruction signal for focusing said optical unit,
   said signal forming circuit being responsive to the actuation of an operation member for starting photography while the number of pieces of information from said detection device is still smaller than the predetermined number, to determine a different average, which is the average of the smaller number of piece of information, to form the operating instruction signal for focusing said optical unit.

13. An optical apparatus according to claim 12, wherein said detection circuit includes a unit which produces range finding information.

14. An optical apparatus according to claim 12, wherein said optical unit includes a photographic lens.

15. An optical apparatus according to claim 12, wherein said signal forming circuit includes means for forming the operation instruction signal based on information obtained through averaging a plurality of pieces of information from said detection circuit.

16. An optical apparatus according to claim 12, wherein the operation member for starting photography includes a shutter release member.

17. An optical apparatus according to claim 12, wherein said signal forming circuit includes means for changing the predetermined number in accordance with a distance indicated by the information from said detection circuit.

18. An optical apparatus according to claim 12, wherein said detection circuit includes a unit which produces the information through a double integration.

19. An optical apparatus according to claim 12, wherein said signal forming circuit includes means for causing said detection circuit to repeat an operation the predetermined number of times so as to enable said detection circuit to produce the predetermined number of pieces of information.

20. An optical apparatus according to claim 19, wherein said signal forming circuit includes means for setting a predetermined suspension period between successive operations of said detection circuit.

21. An optical apparatus according to claim 12, wherein said signal forming circuit includes means for changing the predetermined number in accordance with a level of light received by said detection circuit so as to produce the information.

22. An optical apparatus according to claim 12, wherein said signal forming circuit includes a unit which actuates said optical unit in accordance with the operation instruction signal.

23. An optical apparatus according to claim 12, wherein said optical instrument comprises a camera.

24. A focusing apparatus comprising:

a detection circuit which produces, in sequence, pieces of information for focusing an optical unit; and a focusing control unit which forms an operation instruction for focusing from a single piece of information produced from the detection circuit when such single piece of information produced by the detection circuit at a certain time represents a distance which is closer than a predetermined distance, and which forms an operation instruction for focusing on the basis of a plurality of said pieces of information when said single piece of information produced from said detection circuit represents a distance which is farther than the predetermined distance.

* * * * *